Patented Sept. 2, 1947

2,426,832

UNITED STATES PATENT OFFICE 2,426,832

REMOVAL OF CATALYST FROM REACTION PRODUCT

John W. Latchum, Jr., Bartlesville, Okla., assignor to Phillips Petroleum Company, a corporation of Delaware No Drawing. Application October 5, 1942, Serial No. 460,858

6 Claims. (Cl. 260—683.5)

This invention relates to hydrocarbon conversions, and more particularly to the purification of fluid reaction effluents from hydrocarbon conversions carried out in the presence of an anhydrous normally solid or liquid metal halide of the Friedel-Crafts type which is readily volatilizable or highly soluble in the effluent and in the presence of anhydrous hydrogen halide, which effluents contain hydrocarbons, usually both the original and the product hydrocarbon in addition to any by-products, volatilized metal halide and hydrogen halide, as well as other organic material whose chemical identity is not clearly understood at present.

Still more particularly the invention relates to isomerization of normal paraffins to the corresponding iso-paraffins, and especially of normal butane to isobutane, by means of a metal halide catalyst of the type referred to above and in the presence of anhydrous hydrogen halide, usually corresponding to the metal halide catalyst. Usually the metal halide catalyst is an aluminum halide, generally aluminum chloride or bromide. Even more specifically the invention relates to such a process wherein the reaction effluent leaves the isomerization unit in the vapor or liquid phase and is subjected to a purification treatment to remove therefrom the volatilized or dissolved metal halide catalyst contained therein and the organic material other than paraffins, while allowing the hydrogen halide to remain unaffected.

At the present time, hydrocarbon conversions effected with the aid of aluminum chloride or the like metal halide catalyst, are characterized by the difficulty that the catalyst permeates the entire system causing numerous troubles including corrosion, further reaction, clogging, etc. This is especially objectionable in those sections of the equipment which follow the conversion unit. Thus, where the effluent is removed in the vapor phase and, as is almost invariably the case where catalysts of the type described above are used, where the catalyst is readily volatilizable, the effluent contains substantial quantities of vaporized catalyst, and this catalyst in processes heretofore practiced deposits in the equipment after the converter. Again, where the effluent is removed in the liquid phase, it contains substantial quantities of dissolved or dissolved and suspended catalyst which causes difficulties in subsequent processing.

The principal object of my invention is to provide a process overcoming the foregoing difficulties. Another object is to provide a convenient, economical and highly satisfactory process of purifying the reaction effluents from hydrocarbon conversions of the type outlined above. Another object is to effect removal of the volatilized catalyst from vaporous effluents of the above type. Still another object is to effect removal of the dissolved catalyst from liquid effluents of the type described above. Another object is to purify the reaction effluents in such manner as to remove not only the catalyst contained therein, but also the major part or all of the organic material other than pure hydrocarbon, including complexes formed between the metal halide catalyst and hydrocarbons and other compounds whose exact chemical nature is at present but little understood. Another object is to provide a process of the type set forth in the preceding type wherein the hydrogen halide in the reaction effluent is for the most part not removed therefrom but is left in the residual hydrocarbon, which is a distinct advantage since this very valuable hydrogen halide may be very easily recovered from the treated hydrocarbon for recycle to the conversion. Numerous other objects will hereinafter appear.

In accordance with the present invention, a reaction effluent of the type described in detail above is purified by treatment with sulfuric acid. I have discovered that upon treating the effluent, preferably immediately following the catalyst chamber, with sulfuric acid, the metal halide catalyst contained therein is substantially completely or entirely removed therefrom. At the same time non-hydrocarbon organic material of but little understood nature such as complexes of metal halide with hydrocarbon, etc., is also removed in substantial entirety.

A distinct advantage of this purification method is that the hydrogen halide content of the effluent is substantially unaffected by the sulfuric acid with the result that it passes through the treatment along with the hydrocarbon product and unconverted hydrocarbon contained in the effluent. Only that small amount of hydrogen halide required to saturate the sulfuric acid treating medium is removed from the effluent, the entire amount of hydrogen halide passing through unchanged after this saturation.

The process is particularly applicable to effluents in which the hydrocarbons present are paraffins in type. Thus it has particular advantage in the treatment of the effluent from the isomerization of normal paraffins to isoparaffins since substantially the only hydrocarbons found in the effluent from such a process are paraffins including the isoparaffin product and unconverted normal paraffin.

However, the process may be applied to effluents from conversions other than paraffin isomerization. For example, it may be employed to purify the effluent from the metal halide-catalyzed alkylation of isoparaffins with low-boiling olefins, where such effluent does not contain an undue amount of olefins. It will be understood that olefins are highly reactive with sulfuric acid and so are removed from the effluent.

An example of another effluent which may be treated by the present invention is that from the cracking of high-boiling petroleum oils to make gasoline in the presence of aluminum chloride or the like and hydrogen chloride. Such an effluent contains little or no non-paraffins and so is very advantageously treated by the process of my invention.

I prefer to apply my invention to a vaporous effluent, such as the vaporous effluent from the isomerization of normal butane to isobutane in the presence of aluminum chloride or bromide and the corresponding hydrogen halide. In such an application, I scrub the vaporous effluent with the sulfuric acid, for example, in an absorber directly following the catalyst chamber. Since normal paraffins are unaffected and isoparaffins are substantially unaffected by sulfuric acid, the treated effluent consists of the isoparaffin, the unconverted normal paraffin, and any lighter paraffins formed in the converter, and practically all of the hydrogen halide. This mixture may be readily treated by known methods to recover the hydrogen halide for recycle.

The use of concentrated sulfuric acid, at least 90%, is preferred. I prefer to use 95% sulfuric acid which is easy to handle and is conveniently available at the refinery. I have found that the presence of some water in the sulfuric acid is practically a necessity for successful operation. At least 1% and preferably 5% of water should be present.

Less preferably, sulfuric acid more dilute than the 90% acid may be used where the serious corrosion problems normally attending use of dilute aqueous sulfuric acid can be overcome.

The reactions involved in the purification are believed to include the following:

(1) $2AlCl_3 + 3H_2SO_4 \rightarrow 6HCl + Al_2(SO_4)_3$
(2) $2AlCl_3 + 3H_2SO_4 \rightarrow 6HCl + 3SO_2 + 2Al_2O_3$ Reaction 1 is predominant or exclusive at relatively low temperatures, namely below 200° F. At relatively high temperatures, namely of 200° F. or over Reaction 2 becomes important. Other reactions than those indicated may take place, and it is to be understood that I am not limited to any theory with respect to the operation of my invention.

It will be noted that the reactions indicated involve the generation of the hydrogen halide corresponding to the metal halide catalyst. This is frequently an advantage since metal halide which might otherwise be wasted or lost is thus converted to hydrogen halide which is available for recycle as promoter for the conversion. This is especially the case where the metal halide entering the reaction is combined or dissolved in the form of a complex or sludge.

It is believed that only a part of the metal halide, e. g. aluminum chloride, reacts with the sulfuric acid. It is thought that the remainder is simply absorbed or dissolved without reaction.

The temperature used in the purification treatment may vary widely. Where, as in the preferred embodiment, a vaporous effluent is being treated it is preferred to use temperatures sufficiently high that condensation of the hydrocarbons being treated is prevented but below 200° F., the temperature at which Reaction 2 takes place.

However, it is perfectly possible when treating vaporous effluent, to operate the sulfuric acid absorption step at a temperature such that condensation, partial or complete, of the hydrocarbon content thereof takes place. As will be understood, whether condensation takes place or not and, if so, to what extent depend also upon the pressure maintained in the absorption step. Ordinarily this pressure will be substantially the same as that in the isomerization step although it may be materially higher or lower than said pressure by the use of suitable pressure increasing means (e. g. a pump or compressor) or pressure reducing means between the catalytic converter and the absorber.

The absorber may, if desired, function as a cooler and/or a quencher for the vaporous effluent where the said vapors are at a temperature materially hotter than the sulfuric acid absorption medium. Thus the quenching, i. e. rapid cooling of the hot reaction effluent, may serve to prevent re-reaction between the reaction products.

Where a vaporous effluent is treated in the absorber in such manner that condensation of hydrocarbons contained in the effluent, layer separation is allowed to take place, preferably continuously in any suitable manner obvious to those skilled in the art. The sulfuric acid phase is separated from the hydrocarbon layer and each further treated in any desired manner.

Where a liquid reaction effluent is treated with sulfuric acid in accordance with the invention, the treatment may be conducted at any temperature ranging from the freezing point upwards but preferably below 200° F. The treatment may be conducted in any apparatus known to be suitable for intimate liquid-liquid contacting, following which the separation of phases is made and the two separated phases, raffinate and extract, further processed separately in any suitable way.

As an example of the invention, the vaporous effluent from the vapor phase isomerization of normal butane to isobutane at a pressure of 150 pounds per square inch gauge and a temperature of 210-250° F. over lump aluminum chloride and in the presence of hydrogen chloride as a promoter, is passed at said temperature and pressure from the converter through pressure-reducing means and then through a cooler to bring said effluent to a temperature approaching 100° F. while still maintaining the vapor phase. The gaseous effluent is then scrubbed in an absorption unit at about 100° F. with 95% sulfuric acid which is at a temperature of 100° F. All of the aluminum chloride vapors and fines in the vapors are removed. In addition the aluminum chloride complexes are broken down so that the effluent contains no aluminum chloride either free or combined. The scrubbed effluent was in the vapor phase and consisted of isobutane, normal butane, virtually all of the hydrogen chloride which left the isomerizer, and small quantities of lighter gases than $C_4$ including propane.

Sulfuric acid recovery

After the sulfuric acid absorption medium is spent, it may be either discarded or repurified for reuse. This recovery may be carried out in any suitable manner. A convenient method is to dilute the spent acid with water to precipitate the solids and any hydrocarbons or oily materials, whereupon the clear dilute solution of acid may be drawn off and reconcentrated for reuse in the process.

*Batch or continuous operation*

The process may be operated in either a batchwise or a continuous manner, the latter being preferred. Thus the vapors leaving a continuously operated isomerization unit may be continuously passed to the absorption unit into which fresh absorbing medium is continuously introduced. Rich or spent sulfuric acid is continuously withdrawn at the same rate as the fresh was introduced. The treated effluent is continuously passed in vapor form to a unit where the hydrogen chloride is continuously separated and a suitable portion or all thereof recycled. The unconverted normal butane may be separated from the isobutane in the same or a separate unit and recycled for further conversion.

While an aluminum halide, namely either aluminum chloride, bromide or very infrequently, iodide, is most commonly used as the catalyst in carrying out my invention other metal halides of the Friedel-Crafts type and which are normally either liquid or solid, usually the latter, may be used. Examples are the chlorides, bromides or iodides of the following metals:

Zinc
Tin
Arsenic
Antimony
Zirconium
Titanium
Iron
Boron
Beryllium, etc.

It will be understood that many changes may be made in the detailed embodiments described above and that the invention is to be taken as limited only by the terms or spirit of the appended claims.

I claim:

1. In the vapor phase isomerization of normal butane to form isobutane in the presence of aluminum chloride catalyst and promoting amounts of hydrogen chloride, wherein vaporous reaction zone effluents contain isobutane, hydrogen chloride and residual aluminum chloride, the improvement which comprises scrubbing said effluents at an elevated temperature in the vapor phase with liquid concentrated sulfuric acid under conditions effecting substantially complete removal of said aluminum chloride therefrom with consequent formation of hydrogen chloride while avoiding any substantial removal of hydrogen chloride therefrom, and separating from the thus-treated effluents hydrogen chloride originally present in said effluents and also hydrogen chloride formed during said scrubbing and returning same to said reaction zone as catalyst promoter.

2. The process of claim 1 in which said scrubbing is effected at a temperature below that at which sulfur dioxide is formed in undesired amounts.

3. In a hydrocarbon conversion process wherein conversion is continuously effected in the presence of an aluminum chloride catalyst promoted with hydrogen chloride in a reaction zone and wherein the effluent product stream from said reaction zone contains carry-over aluminum chloride, the improved method of operation which comprises continuously contacting said effluent product stream in a contacting zone subsequent to the reaction zone with an amount of sulfuric acid of a strength within the approximate range of 90 per cent to 98 per cent sufficient to effect removal of carry-over aluminum chloride from said effluent product stream, to effect the reaction of the removed carry-over aluminum chloride with sulfuric acid and to produce hydrogen chloride whereby the hydrogen chloride content of the effluent product stream is augmented, continuously introducing said stream with augmented hydrogen chloride content into a hydrogen chloride removal zone, continuously removing hydrogen chloride from hydrocarbons in said removal zone and continuously recycling said removed hydrogen chloride to said reaction zone.

4. In the vapor phase conversion of hydrocarbons in the presence of aluminum chloride catalyst and promoting amounts of hydrogen chloride, wherein vaporous reaction zone effluents contain hydrocarbon conversion product, hydrogen chloride and residual aluminum chloride, the improvement which comprises scrubbing said effluents at an elevated temperature in the vapor phase with liquid concentrated sulfuric acid under conditions effecting substantially complete removal of said aluminum chloride therefrom with consequent formation of hydrogen chloride while avoiding any substantial removal of hydrogen chloride therefrom, and separating from the thus-treated effluents hydrogen chloride originally present in said effluents and also hydrogen chloride formed during said scrubbing and returning same to said reaction zone as catalyst promoter.

5. In a vapor phase coversion of hydrocarbons in the presence of a metal halide catalyst of the Friedel-Crafts type and promoting amounts of the corresponding hydrogen halide, wherein vaporous reaction zone effluents contain hydrocarbon conversion product, hydrogen halide and residual said metal halide, the improvement which comprises scrubbing said effluents at an elevated temperature in the vapor phase with liquid concentrated sulfuric acid under conditions effecting substantially complete removal of said metal halide therefrom with consequent formation of the corresponding hydrogen halide while avoiding any substantial removal of hydrogen halide therefrom, and separating from the thus-treated effluents hydrogen halide originally present in said effluents and also hydrogen halide formed during said scrubbing and returning same to said reaction zone as catalyst promoter.

6. In a hydrocarbon conversion process wherein conversion is continuously effected in the presence of a Friedel-Crafts type metal halide catalyst promoted with the corresponding hydrogen halide in a reaction zone and wherein the effluent product stream from said reaction zone contains carry-over metal halide, the improved method of operation which comprises continuously contacting said effluent product stream in a contact zone subsequent to the reaction zone with an amount of sulfuric acid of a strength within the approximate range of 90 per cent to 98 per cent sufficient to effect removal of carry-over metal halide from said effluent product stream, to effect the reaction of the removed carry-over metal halide with sulfuric acid and to produce the corresponding hydrogen halide whereby the hydrogen halide content of the effluent product stream is augmented, continuously introducing said stream with augmented hydrogen halide content into a hydrogen halide removal zone, continuously removing hydrogen halide from hydrocarbons in said removal zone and continuously recycling said removed hydrogen halide to said reaction zone.

JOHN W. LATCHUM, Jr.

REFERENCES CITED

The following references are of record in the file of this patent:

UNITED STATES PATENTS

| Number | Name | Date |
|---|---|---|
| 1,277,329 | McAfee | Aug. 27, 1918 |
| 1,326,072 | McAfee II | Dec. 23, 1919 |
| 1,623,025 | Buerger | Mar. 29, 1927 |
| 1,801,627 | Hanna | Apr. 21, 1931 |
| 1,953,612 | Jenkins et al. | Apr. 3, 1934 |
| 2,314,297 | Watson | Mar. 16, 1943 |
| 2,365,917 | Thomas | Dec. 26, 1944 |
| 2,375,321 | Nysewander et al. | May 8, 1945 |

OTHER REFERENCES

Babor et al., "General College Chemistry," Crowell Co., N. Y. (1940), page 319. (Copy in Division 59.)

Moldavskii et al., J. Gen. Chem. U. S. S. R. 5 Ser. A (1935), pages 1791–7. A translation is available in 260–683.5 of which page 3 is pertinent.